(12) United States Patent
Cera

(10) Patent No.: US 12,280,475 B2
(45) Date of Patent: Apr. 22, 2025

(54) BIT HOLDER WITH IMPACT LOAD PROTECTION UNIT

(71) Applicant: WÜRTH INTERNATIONAL AG, Chur (CH)

(72) Inventor: Udo Cera, Schwäbisch Hall (DE)

(73) Assignee: Würth International AG (CH)

( * ) Notice: Subject to any disclaimer, the term of this patent is extended or adjusted under 35 U.S.C. 154(b) by 663 days.

(21) Appl. No.: 17/239,464

(22) Filed: Apr. 23, 2021

(65) Prior Publication Data

US 2021/0362309 A1 Nov. 25, 2021

(30) Foreign Application Priority Data

May 20, 2020 (DE) .................... 10 2020 113 683.8

(51) Int. Cl.
| | |
|---|---|
| *B25B 23/00* | (2006.01) |
| *B25B 21/00* | (2006.01) |
| *B25B 21/02* | (2006.01) |

(52) U.S. Cl.
CPC .......... *B25B 23/00* (2013.01); *B25B 23/0035* (2013.01); *B23B 2231/04* (2013.01); *B25B 21/007* (2013.01); *B25B 21/02* (2013.01); *Y10T 279/3406* (2015.01); *Y10T 279/3493* (2015.01)

(58) Field of Classification Search
CPC . B25B 23/00; B25B 23/0035; B23B 2231/04; Y10T 279/3406; Y10T 279/3493
See application file for complete search history.

(56) References Cited

U.S. PATENT DOCUMENTS

| 4,209,182 | A | 6/1980 | Sheldon |
| 5,996,452 | A | 12/1999 | Chiang |
| 7,086,313 | B2 | 8/2006 | Cantion |
| 8,061,718 | B2 | 11/2011 | Krondorfer |
| 9,833,887 | B1 | 12/2017 | Liu |
| 2003/0098169 | A1* | 5/2003 | Phillips .................. B25F 5/029 173/93.5 |

(Continued)

FOREIGN PATENT DOCUMENTS

| CN | 109014329 A | 12/2018 |
| DE | 298 22 074 U1 | 3/1999 |

(Continued)

OTHER PUBLICATIONS

European Search Report for Patent Application No. 21168505.2, dated Nov. 25, 2021, 8 pages.

(Continued)

*Primary Examiner* — Eric A. Gates
*Assistant Examiner* — Eric Daniel Whitmire
(74) *Attorney, Agent, or Firm* — Womble Bond Dickinson (US) LLP

(57) ABSTRACT

A bit holder for holding a bit for coupling the bit with a drive tool, wherein the bit holder comprises a receiving unit which is configured for receiving the bit, a tool coupling which is configured for coupling with the drive tool, and an impact load protection unit which is configured for protecting from an impact load which is acting on the bit holder, in particular on a fixing sleeve of the bit holder, when impinging the bit holder on an anchoring base, when an attachment element which is to be driven by the bit, the drive tool and the bit holder, is inserted into the anchoring base.

18 Claims, 5 Drawing Sheets

(56) References Cited

U.S. PATENT DOCUMENTS

| | | | |
|---|---|---|---|
| 2005/0176283 A1* | 8/2005 | Cantlon | B25B 23/0035 439/282 |
| 2007/0218750 A1 | 9/2007 | Corrao et al. | |
| 2009/0311061 A1 | 12/2009 | Santamarina et al. | |
| 2012/0150237 A1 | 6/2012 | Combrowski | |
| 2015/0037111 A1 | 2/2015 | Chang | |

FOREIGN PATENT DOCUMENTS

| | | |
|---|---|---|
| DE | 199 07 837 A1 | 9/2000 |
| DE | 10 2008 040 701 A1 | 4/2009 |
| DE | 10 2010 016 812 A1 | 3/2011 |
| DE | 202020100546 U1 | 6/2020 |
| WO | 2005060551 A2 | 7/2005 |

OTHER PUBLICATIONS

European Supplemental Search Report for Application No. 21168505.2, dated Oct. 12, 2021, 8 pages.
Corresponding German Search Report of 10 2020 113 683.8, dated Jan. 28, 2021, 6 pages.
Wurth, "Bit Drill Holder 1/4 Inch" Bit drill holder E 6.3 (1/4) 4-way ball clamp, HALT-BIT-SWF-1 / 4IN-L60MM, Zebra, Item No. 0614176760, https://eshop.wuerth.de/1-4-inch-bit-drill-holder-HOLD-BIT-QCCHUK-1-4IN-L60MM/0614176760.sku/en/US/EUR/?CampaignName=SR001&VisibleSearchTerm=0614176760, 7 pages, Printed Apr. 2021.
Wurth, "Universal Holder E 6.3 (1/4 Inch)" Universal, holder E 6.3 (1/4) stainless steel magnet HALT-BIT-HUE / SPRENGRG-MAGN-1 / 4IN-L74MM, Item No. 0614176702, https://eshop.wuerth.de/Universalhalter-E-63-1-4-in-HALT-BIT-HUE-SPRENGRG-MAGN-1-4ZO-L74MM/0614176702.sku/de/DE/EUR/?CampaignName=SR001&VisibleSearchTerms=0614+176+702, 6 pages, Printed Apr. 2001.
Wurth, "Countersink with Depth Stop" Countersink with depth stop AUFSTESER-HOBO-(HW)-D6MM, Zebra, Item No. 0650700600, https://eshop.wuerth.de/Versenker-mit-Tiefenanschlag-AUFSTESER-HOBO-HW-D6MM/0650700600.sku/de/DE/EUR/?CampaignName=SR001&VisibleSearchTerm=0650700600, 8 pages, Printed Apr. 2021.
Wurth, "Universal Holder 6.3 (1/4 inch)" Universal holder E 6.3 (1/4) fast sw. adjustable, HALT-BIT-HUE / SPRENGRG-MAGN-1 / 4IN, Item No. 0614811360, https://eshop.wuerth.de/Universalhalter-E-63-1-4-in-HALT-BIT-HUE-SPRENGRG-MAGN-1-4ZO/0614811360.sku/de/DE/EUR/?CampaignName=SR001&VisibleSearchTerm=061481360, 5 pages, Printed Apr. 2021.
BefestigungsFuchs: "1 EuroTec bit holder with depth stop and slip clutch—magnetic" Item No. 65501 27 80, https://www.befestigungsfuchs.de/werkzeug/bitwerkzeuge/bithalter/mit-tiefenanschlag/1-eurotec-screw-stop-schraubkupplung-mit-tiefenanschlag, 6 pages, Printed Apr. 2021.
Australian First Examination report to Application No. 2021202668 dated Feb. 2, 2022, 7 pages.

* cited by examiner

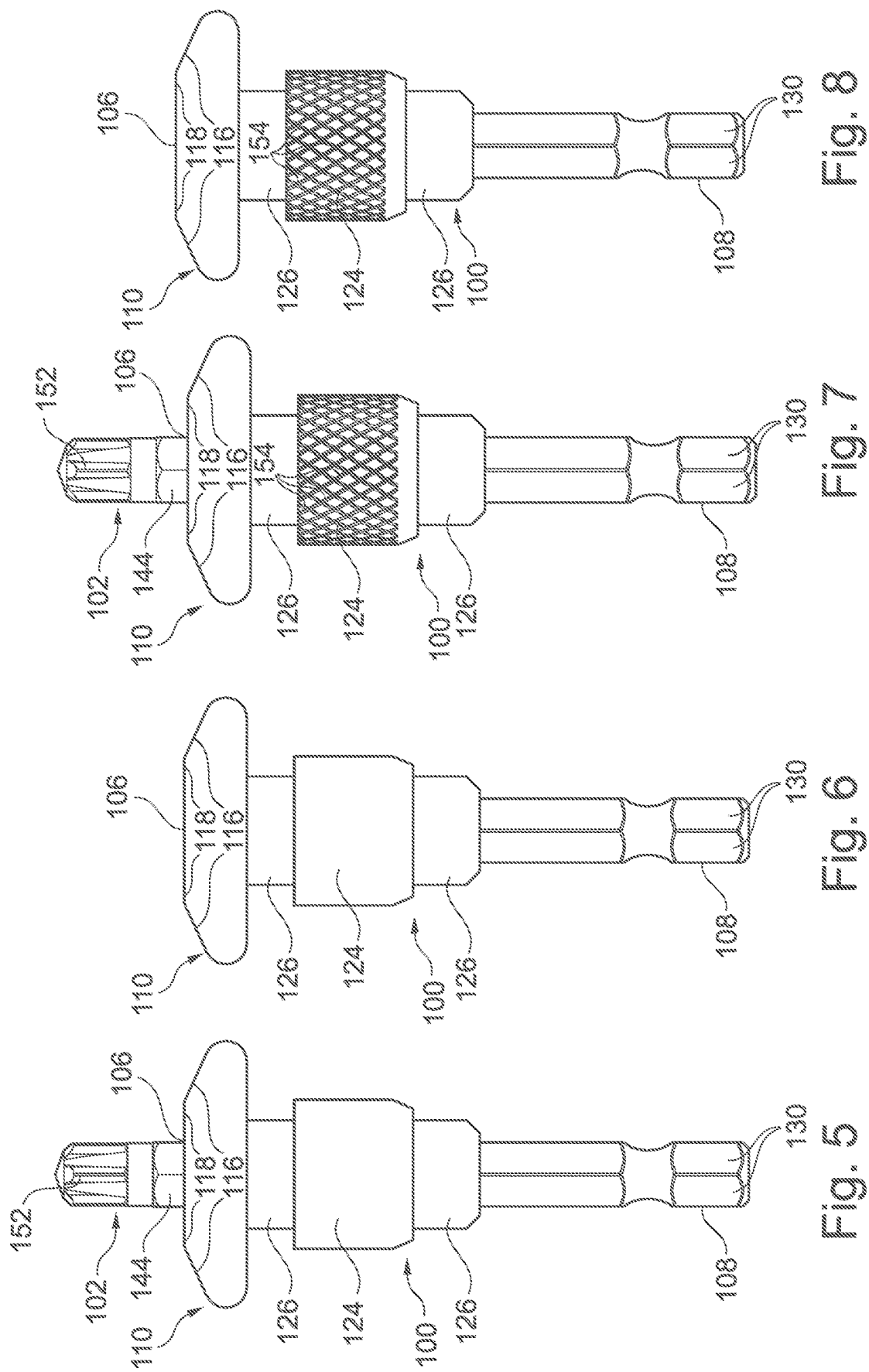

BIT HOLDER WITH IMPACT LOAD PROTECTION UNIT

This application claims the benefit of the filing data of German Patent Application No. 10 2020 113 683.8 filed 20 May 2020, the disclosure of which is hereby incorporated herein by reference.

TECHNICAL FIELD

Embodiments of the invention relate to a bit holder for holding a bit for coupling the bit with a drive tool, an arrangement for inserting an attachment element into an anchoring base, and a method for inserting an attachment element into an anchoring base.

TECHNOLOGICAL BACKGROUND

The use of bits has the advantage that, with a single tool, a large bandwidth of screw-drives with different sizes may be inserted. Bit holders between a bit and a drive tool facilitate the bit replacement and also serve as an adapter, such that a drilling machine may be utilized for screwing, for example. Furthermore, a bit holder enables an effective extension of the bit. This has advantages, for example when screws shall be placed flushly or at angled positions.

Drive tools, such as cordless screwdrivers, cordless screw drillers (German: Akku-Bohrschrauber), drilling machines, impulse screwdrivers and hammer drillers frequently have a quick-action drill chuck (German: Schnellspannbohrfutter) or a magnetic internal hexagon reception which are compatible with many bits for different screw-drives. Bit holders may additionally facilitate the works. In particular in the case of an internal hexagon which can be frequently found at cordless screwdrivers, it may happen that the bit falls out of the reception when working. A bit holder secures the bit and furthermore enables rapid bits replacements by one hand. Bit holders enable drilling and screwing without a tool replacement, for example.

It is disadvantageous that bits and/or a bit holders may fail, when screws are deeply countersunk in wood with the head. Thereby, the bit holder and/or the bit may receive an impact when impinging in the wood, and the mechanics may be damaged.

SUMMARY OF THE INVENTION

There may be a need to provide a robust bit holder which, in common with a bit, is also utilizable under harsh conditions in an operationally safe manner.

The subject matters with the features according to the independent patent claims are provided. Further embodiments are shown in the dependent claims.

According to an embodiment of the present invention, a bit holder for holding a bit for coupling the bit with a drive tool is provided, wherein the bit holder comprises a receiving unit which is configured for receiving the bit, a tool coupling which is configured for coupling with the drive tool, and an impact load protection unit which is configured for protecting from an impact load which is acting on the bit holder (in particular on a fixing sleeve of the bit holder), when the bit holder impinges on an anchoring base, when an attachment element which is to be driven by the bit, the driving tool, and the bit holder, is inserted into the anchoring base.

According to a further embodiment of the present invention, an arrangement for inserting an attachment element into an anchoring base is provided, wherein the arrangement comprises a bit holder with the above described features for holding a bit and for coupling the bit with a drive tool, and the bit which is received or receivable at the receiving unit of the bit holder.

According to a still further embodiment of the present invention, a method for inserting an attachment element into an anchoring base by a bit and a drive tool is provided, wherein the method comprises receiving the bit at a receiving unit of a bit holder, coupling a tool coupling of the bit holder with the drive tool, inserting the attachment element into the anchoring base by applying an inserting force which is acting on the attachment element by the bit, the drive tool and the bit holder, and providing the bit holder with an impact load protection unit for protecting from an impact load which is acting on the bit holder (in particular on a fixing sleeve of the hit holder) when impinging the bit holder on the anchoring base when inserting.

In the context of the present application, a "bit" in particular may denote a replaceable drive element (for example a screwdriver blade) without a handle for a certain profile of an attachment element (for example a screw head profile). Examples for bit-profiles are a slot-profile, a cross-slot-profile, a hexagonal-profile, a torx-profile and an AW-profile. A receiving end which is hexagonal, for example, of a bit may be shaped such that the bit may be inserted in a correspondingly shaped bit holder.

In the context of the present application, "bit holder" in particular may denote an adapter in a strand of drive tool-bit holder-bit which enables a coupling with a bit at one side and a coupling with a drive tool at another, opposing side. A bit holder may be a separate part with respect to a drive tool or may be configured and/or mounted as a fixed part of the drive tool (for example a handle or a cordless screwdriver).

In the context of the present application, "drive tool" in particular may denote a device by which a driving force may be applied which may be transferred by a bit holder to a bit. The driving force in particular may be a rotating or rotationally driving force, optionally superimposed with a translational driving force. In other words, the drive tool may be configured for rotationally driving the bit holder and the bit and thus an attachment element whose drive is coupled with the bit in a non-rotational manner. Alternatively, the driving force may also be a purely translational driving force. A driving force of a driving tool may be a pneumatic, a hydraulic, or an electric driving force which is generated by a pneumatics unit, a hydraulics unit, or an electric motor, for example, or may be a muscle force of a user. Examples for driving tools are a cordless screwdriver, a cordless screw driller, a mechanical screwdriver, an impulse screwdriver, a ratchet screwdriver, a drilling machine, an impact wrench, and a hammer driller. Also a handle which is rotatable by a user with a coupling which is coupleable with a bit holder may be utilized as driving tool. Further examples for a driving tool are a screwdriver handle, an angled handle, a ratchet or a torque wrench.

In the context of the present application, "attachment element" in particular may denote a body which may be, in particular rotatingly, inserted into an anchoring base by the bit which is arranged in the bit holder and driven by the drive tool. Preferably, the attachment element is a screw, especially preferred a wood screw for inserting into an anchoring base made of wood. Alternatively, the attachment element may also be a nail or a rivet, for example. The attachment element may be configured to be insertable into the anchoring base without a pre-drilled hole or after forming a pre-drilled hole. A rotatingly inserted attachment element may comprise a self-cutting or self-tapping external thread.

In the context of the present application, the term "anchoring base" in particular may denote a base which is suitable for anchoring the attachment element. Such an anchoring base in particular may be or comprise a wall, further in particular a vertical wall. Materials for such an anchoring base in particular are wood or wood materials, as well as concrete- and brickwork materials, metal or plastic components. Furthermore, such an anchoring base may be an arbitrary composite material made of multiple different material components. The anchoring base may comprise cavities or may be massive (i.e. free from cavities).

In the context of the present application, an "impact load protection unit" in particular may denote at least one body or a mechanism which receives, shields, reduces, softens, attenuates and/or absorbs an impact load which is acting on the bit holder (in particular on a fixing sleeve of the bit holder) when inserting the attachment element into the anchoring base and when impinging the bit holder at a (in particular planar) outer surface of the anchoring base. In other words, with the impact load protection unit, a lower impact load acts on the rest of the bit holder than without the impact load protection unit. For example, the impact load protection unit may be configured as a disk, a cylinder or a sphere which protects at least a portion of the bit holder from an impact. However, it is also possible to configure the impact load protection unit as an electronic mechanism which performs an electronic measurement of an impact by a measuring sensor or the like and transmits a feedback to an electronic drive tool, by which a (rotating) drive of the drive tool and therefore the bit holder is stopped, in order to protect at least a part of the bit holder from an impact effect. For example, the impact load protection unit may also implement a spring (for example configured as a spring collar) or another pre-biasing element which damps an impingement of the bit holder on the anchoring base. Possible materials of the impact load protection unit are metals (for example steel), plastic (in particular hard plastic), rubber (in particular hard rubber) and/or glass fiber material and/or glass fiber reinforced material.

According to an embodiment of the present invention, an impact-protected bit holder is provided which, even when impinging the bit holder at an anchoring base when placing an attachment element, is protected from an overload and thus a damage of the bit holder. In particular, a stable (and preferably non-magnetically configurable) mechanic bit holder may be provided which is advantageous in a special manner when using in the wood construction. Especially in wood construction, it may happen that an attachment element is placed deeply in an anchoring base made of wood (for example such that a head of the attachment element is located in the interior of the anchoring base) and the bit holder impinges against an outer surface of the anchoring base. When the attachment element is a screw, for example, due to this pushing of the screw into the anchoring base, the impact force which is acting on the bit holder when impinging on the anchoring base may be considerable. By the fact that, according to an exemplary embodiment, such a bit holder is equipped with an impact load protection unit, an excessive pressure load in particular on a fixing or locking sleeve of the bit holder during a screwing operation is reliably avoided. This prevents a destruction of the locking and thus of the bit holder as a whole. Hence, according to an embodiment of the invention, an effective impact protection for a fixing sleeve of a bit holder is provided which enables a high operational safety even under robust conditions. In particular, according to embodiments of the invention, it may be avoided that a bit-chuck strikes against a drilling hole or another anchoring base in an unbraked and unprotected manner.

In the following, additional exemplary embodiments of the bit holder, the arrangement and the method are described.

According to an exemplary embodiment, the impact load protection unit may comprise an inclined surface, in particular configured as an annular inclined surface, which is facing the anchoring base. It has turned out that such an inclined surface with an angle of inclination with respect to a (in particular planar) outer surface of the anchoring base gives a user a sufficiently early haptic feedback about reaching the outer side of the anchoring base. Therefore, a user may stop the (rotating) actuation by the drive tool with a certain pre-warning time without damaging the bit holder. The inclined surface may also serve as damping measure for damping the impingement of the bit holder on the anchoring base, when the attachment element advances into the interior of the anchoring base. Descriptively, such an inclined surface prevents an uninhibited frontal collision of two parallel surfaces and also promotes a friction force between the anchoring base and the inclined surface, when the bit holder rotates when placing the attachment element. Descriptively, the Inclined surface may be formed taperingly (in particular conically taperingly) in the direction of the anchoring base.

According to an exemplary embodiment, the impact load protection unit may comprise a front surface which is arranged with respect to the inclined surface in an inserting direction at a front side and which is oriented perpendicularly to the inserting direction. Hence, the impact load protection unit may comprise a front surface which is oriented in parallel with respect to the anchoring base, between the inclined surface and the anchoring base, in particular configured as an annular front surface. Such a preferably annular front surface may advantageously serve as a tilting protection which may inhibit an undesiredly tilting of the bit holder when reaching the anchoring base.

According to an exemplary embodiment, the annular front surface of the impact load protection unit may form an axial end of the bit holder. In this case, an end portion of a bit sleeve of the bit holder may be accommodated in an inner lumen of the impact load protection unit, for example, such that only the impact load protection unit which is especially configured for this purpose may come in contact with the anchoring base and the bit sleeve is therefore protected from a damage when placing the attachment element.

Alternatively, a bit sleeve may slightly protrude with respect to the annular front surface of the impact load protection unit in the axial direction, to thereby form a hollow cylindrical ring connector (German: Ringstutzen) which is joining the annular front surface at a step. Such a ring connector with a very short dimension may advantageously used for welding the impact load protection unit with the bit sleeve at the front side.

According to an exemplary embodiment, the impact load protection unit may comprise a truncated cone-shaped ring body portion which is facing the anchoring base. A hollow truncated cone with a sufficiently large opening angle has turned out as especially suitable solution for the impact load protection unit, since both, an impact-damping and a bit sleeve of the bit holder protecting effect and a tilting protection with a spatial guiding function may be provided. Furthermore, such an inclined surface gives a user a noticeable feedback that the outer side of the anchoring base is reached, such that a user may restrict a driving force in time.

According to an exemplary embodiment, an acute angle between the inclined surface and a central axis of the bit holder may deviate from a right angle by a maximum of 30°, in particular by a maximum of 20°, further in particular by a maximum of 10°, but preferably by at least 5°. When the angle gets too large, it leads to an almost frontal impingement of the impact load protection unit on the anchoring base and therefore to a reduced impact protection. When this angle gets too small, it may lead to a certain susceptibility to tilting.

According to an exemplary embodiment, the impact load protection unit may be replaceably attached to the bit holder, in particular screwably or unscrewably attached. The impact load protection unit, according to its intended purpose, is the component of the bit holder on which the highest mechanical load is acting when impinging on the anchoring base. Therefore, the impact load protection unit may be exposed to a certain wear in a continuous operation. When the impact, load protection unit is configured detachably from the rest of the bit holder, after wearing the impact load protection unit, it may be detached from the bit holder and replaced. The rest of the bit holder may be further used. Especially advantageously is forming a reversible screw connection between the impact load protection unit and the bit sleeve, since this enables simply and intuitively replacing the impact load protection unit without impairing the stability of the connection between the bit sleeve and the impact load protection unit and thus the functionality of the impact load protection unit. Selectively replacing the worn impact load protection unit also leads to a resource-saving use.

According to an exemplary embodiment, the impact load protection unit, in the state of the bit received at the receiving unit, may extend circumferentially closed around the bit. In this way, the impact load protection may be ensured in a fully circumferential manner and independently from a circumferential position of the bit holder where a contact with the anchoring base takes place.

According to an exemplary embodiment, the impact load protection unit may be made of a substantially non-magnetic material (in particular made of a non-permanent magnetic and/or non-continuously magnetic material, for example made of a diamagnetic or paramagnetic material. For example, the impact load protection unit may be made of non-magnetic stainless steel. Hence, a non-magnetic bit holder may be provided which is in particular especially suitable for screwing in a metallic environment. In such a scenario, a magnetic force which is exerted by a permanent magnetic bit holder could attract metallic swarf which could impair the reliability of a formed placing connection. This may be caused by the fact that metal swarf may reduce the fitting accuracy between a drive of the attachment element and a drive tip of the bit.

For application cases in which problems with respect to metal swarf and the like are not expected, the impact load protection unit and/or other components of the bit holder may alternatively also be made of a magnetic material (in particular a permanent magnetic material).

According to an exemplary embodiment, the bit holder may comprise a fixing sleeve for (in particular selectively) fixing the bit at the receiving unit. A corresponding quick-action drill chuck with fixing sleeve may form a rigid connection between the bit holder and the bit. For example, a corresponding fixing sleeve may be configured axially displaceably over a bit sleeve of the bit holder and/or rotatably. By an axial displacement and/or rotation of the fixing sleeve, the bit holder may be transferred between a position which is fixingly engaging a bit which is form-lockingly received at the receiving unit, and a position which is releasing the bit which is form-lockingly received at the receiving unit. For example, a corresponding mechanism may be configured such that merely forward-displacing the fixing sleeve which is configured as clamping bush (German: Spannbüchse), for example, accomplishes a locking of the bit, and retracting the fixing sleeve causes a release of the bit. This enables a very fast, intuitive and simple (in particular by one hand) bit exchange.

According to an exemplary embodiment, the fixing sleeve may be configured to selectively fix or release a bit which is received at the receiving unit by displacing along the bit sleeve. Displacing may be performed by a user. However, optionally also a self-acting mechanism (for example a spring mechanism) may transport the fixing sleeve back to a target-position after stopping an actuation by a user. Fixing the bit in the receiving unit by the fixing sleeve may be achieved by a sphere clamping (preferably by a four-times-sphere-clamping) and/or a spring, for example. In this case, the bit holder clamps on a surface, such that a clearance between the bit and the bit holder may be reduced. Advantageously, for example when drilling, this causes a high concentricity accuracy. A knurling or the like may be formed as an anti-slip-zone at an outer side of the fixing sleeve, such that no slipping occurs when opening and closing the bit holder. For example, in an intuitive manner, opening the bit holder by forward-displacing the bit sleeve, and closing by retracting the fixing sleeve may be accomplished.

According to an exemplary embodiment, the impact load protection unit may be configured for absorbing an impact motion which is acting on the fixing sleeve of the bit holder when impinging on an anchoring base, to thereby prevent a damage or destruction of the fixing sleeve. This may be achieved by such an arrangement and configuration of the impact load protection unit, that only the impact load protection unit is exposed to a contact load, but not the other components of the bit holder, when impinging the bit holder on the anchoring base.

According to an exemplary embodiment, the bit holder may comprise a bit sleeve (in particular comprising the receiving unit), over which the fixing sleeve is mounted. In particular, the fixing sleeve may be displaceably mounted over the bit sleeve. By displacing the fixing sleeve relatively to the bit sleeve, also user-definedly fixing or releasing the bit at the receiving unit may be performed.

According to an exemplary embodiment, the bit sleeve may comprise an external thread on which an internal thread of the impact load protection unit is screwable or screwed. Such an external thread may be located at an end of the bit sleeve at the side of the bit. In this way, the impact load protection unit may be attached (in more detail screwed) in a manner spatially especially closed to the side of the bit holder which is facing the anchoring base in operation. Such a screw connection also enables a simple replacement of the impact load protection unit which is exposed to a mechanical load and therefore to a wear in a special manner.

According to an exemplary embodiment, the impact load protection unit may be replaceably (in particular screwably and unscrewably) mounted to the bit holder. For this purpose, a preferably metrical thread may be formed at the impact load protection unit, which is screwable to a corresponding thread at a bit sleeve of the bit holder. This enables the replacement of a worn impact load protection unit. Furthermore, thereby a bit holder is usable with different impact load protection units with different sizes, wherein each size corresponds to a screw size.

According to an alternative embodiment, the impact load protection unit may be formed integrally with and undetachably from the bit sleeve of the bit holder, respectively. For example, the impact load protection unit may be welded and/or riveted at the backside (and optionally additionally at the front side) to the bit sleeve. This advantageously prevents that the impact load protection unit loosens from the bit sleeve over time.

According to an exemplary embodiment, the fixing sleeve may be mounted over the bit sleeve at the side of the drive tool, and the impact load protection unit may be mounted over the bit sleeve at the side of the bit, preferably coaxially. Both, the impact load protection unit and the fixing sleeve may be ring components which may be shifted or screwed on the bit sleeve. In the placing direction of the attachment element, the impact load protection unit is preferably arranged in front of the fixing sleeve, in order to protect the latter from an impact load.

According to an exemplary embodiment, the fixing sleeve may extend in the axial direction along a maximum of 50%, in particular along a maximum of 40%, of an axial extension of the bit sleeve. This ensures an actuation of the fixing sleeve by hand by a user and leaves sufficient space to be able to also mount the impact load protection unit over the bit sleeve.

According to an exemplary embodiment, the impact load protection unit may extend in the axial direction along a maximum of 30%, in particular along a maximum of 20%, of the axial extension of the bit sleeve. This enables a space-saving configuration of the impact load protection unit and thus a compact design of the bit holder. The mentioned dimensions have turned out as being sufficient to achieve a significant reduction of the impact load.

According to an exemplary embodiment, the receiving unit may comprise an internal hexagon. In other words, in the receiving device, a receiving opening may be formed which is circumferentially delimited by an internal hexagon. This enables plugging an external hexagon of the bit which is opposing a drive tip on the receiving unit with internal hexagon by a form fit, wherein thereby also a torque transmission between the bit holder and the bit is enabled.

According to an exemplary embodiment, the coupling unit may comprise an external hexagon. In this case, the external hexagon of the coupling unit may be inserted in a chuck of a drive tool (for example a drilling machine or a cordless screwdriver) while enabling a torque transmission.

According to an exemplary embodiment, an outer diameter of the impact load protection unit may be larger than a maximum outer diameter of the attachment element, in particular larger than a maximum outer diameter of a head of the attachment element. This enables to provide by the impact load protection unit an impact protection of the bit sleeve and the fixing sleeve not only in the axial direction, but also in the radial direction.

According to an exemplary embodiment, the method may comprise inserting the attachment element into an anchoring base which comprises wood. In particular, the method may comprise inserting the attachment element in the anchoring base such that a head of the attachment element which is driven by the bit, in the inserted state, extends deeper in the anchoring base than an outer surface of the anchoring base. In the relatively soft anchoring base wood, when placing an attachment element (in particular a wood screw), the tendency to countersink the head of the attachment element in the interior of the anchoring base and thus to achieve a force-intense impingement of the bit holder on the anchoring base which is further promoted by the feed (German; Vorschub) of the screw is especially large. Therefore, conventionally also the risk is especially high that the bit holder is exposed to an excessive force when impinging on the anchoring base and is therefore damaged. Providing an impact load protection unit at the bit holder is therefore especially advantageous under such circumstances.

According to an exemplary embodiment, the impact load protection unit may radially protrude beyond the rest of the bit holder along an entire circumference of the bit holder. This enables a fully circumferential impact protection of the bit holder.

DETAILED DESCRIPTION OF EXEMPLARY EMBODIMENTS

In the following, exemplary embodiments of the present invention are described in detail with reference to the following figures.

FIG. 5 shows a side view of the bit holder with a received bit according to an exemplary embodiment of the invention.

FIG. 6 shows a side view of the bit holder according to FIG. 5 without a bit.

FIG. 7 shows a side view of the bit holder with a received bit according to an exemplary embodiment of the invention.

FIG. 8 shows the side view of the bit holder according to FIG. 7 without a bit.

Same or similar components in different figures are provided with the same reference numbers.

Figure 1:
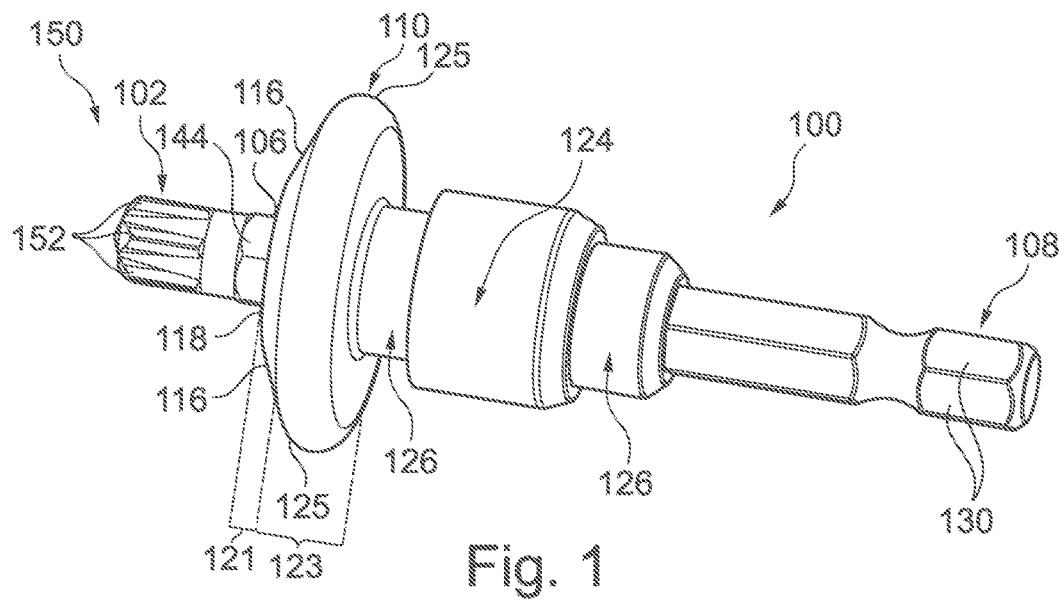
FIG. 1 shows a three-dimensional view of a bit holder with a received bit according to an exemplary embodiment of the invention.

Before referring to the figures exemplary embodiments of the invention are described, some general aspects of embodiments of the invention shall be explained.

Conventional bit holders may show an insufficient wobbling behavior when using a combination of a wood screw, a mechanical bit holder and a cordless screwdriver. In such a combination with bit holder, the wood screw may be exposed to a distinct wobbling motion. For example, when screwing in robinia or construction beech, even an undesired slipping (German: Durchdrehen) of wood screws may occur. In an undesired manner, this may result in the fact that considerable metal swarf deposits at the bit, wherein thereby the fitting accuracy of the bit/screw may be further reduced, such that a slipping of subsequent screws may become even more distinctly. Furthermore, when metal swarf is generated, in particular when using magnetic bit holders, an undesired adhesion of the metal swarf at the bit holder and thus a further reduced placing quality may occur.

According to an exemplary embodiment of the invention, a stable mechanical bit holder is provided which may also be configured non-magnetically and which shows a highly suppressed wobbling behavior. Advantageously, such a preferably non-magnetic mechanically reinforced bit holder may be equipped with an integrated impact protection.

In particular in the wood construction, countersunk screws are frequently countersunk more deeply than up to the wood surface. By deeply countersinking the screw head, a fixing sleeve of a mechanical bit holder may impinge on the wood surface and may suffer a strong mechanical impact. A repeated impact load of this kind may lead to a mechanical damage of the fixing sleeve of the bit holder.

In order to overcome or to at least attenuate such disadvantages, according to an exemplary embodiment of the invention, a preferably inclined impact ring or another impact load protection unit is attached to the tip of the bit holder. Such an impact ring fully or partially absorbs the impact motion and prevents or reduces a damage of the fixing sleeve. The inclination increases the screwing resistance and thereby prevents too deeply countersinking the screw head. When further turning the screw, a further contraction of the both components occurs by the feed of the screw thread, until the bit slips out of the drive. A reliable countersinking depth may be adjusted depending on the projection of the bit and therefore by the bit length. In order to achieve a long life of the impact ring, it may be advantageous to mechanically harden the impact ring and/or to configure the impact ring such that the impact force which is acting on the impact ring is damped or reduced.

When forming such a bit holder, a relatively short fixing sleeve may be combined with a relatively long bit sleeve for the bit reception, such that the impact ring or another impact load protection unit, commonly with a fixing sleeve, may be slid and/or mounted on a bit sleeve. The described dimensioning of the bit sleeve and the fixing sleeve is advantageous to be able to attach the screwed impact protection. Such a screwed impact protection is especially advantageous. Shortening the locking or the fixing sleeve is advantageous for the purpose that the bit holder does not get too long and the locking may still be moved.

Furthermore, advantageously, a metrical thread (preferably an external thread) may be formed at the end of the bit sleeve which is facing the bit, to be able to replaceably screw an impact load protection unit. Since in operation of the bit holder, the impact load protection unit may be exposed to a force effect in a special manner, its replaceable attachment at the bit holder is advantageous, to be able to replace the impact load protection unit as a wearing part, if necessary, under further use the rest of the bit holder. In other words, screwing the, for example disk-shaped, mechanical impact protection as a wearing part or replacement part is possible.

Advantageously, the diameter of such a impact protection disk may be larger than a head diameter of the attachment element (in particular larger than a screw head). For example, a core diameter of a countersunk screw which is actuated by the bit holder with the bit may be 10 mm and a corresponding screw head may have 18.5 mm. In this case, a diameter of an impact protection disk may be 20.5 mm and a thickness of the impact protection disk may be 4 mm, for example. For a screw with a core diameter of 8 mm, the diameter of the impact protection disk may be 18 mm, for a core diameter of 6 mm, the diameter of the impact protection disk may be 14 mm, and for a core diameter of 5 mm, the diameter of the impact protection disk may be 11.5 mm. The detachability of the screwed impact protection disk enables on the one hand the simple replacement of the impact protection disk which is exposed to wearing in a special manner, and on the other hand, in the case of unscrewing a countersunk screw which is deeply countersunk, the deeper insertion into the screwing hole and an adaption to the screw diameter.

In operation, a bit holder according to an exemplary embodiment, of the invention may be combined with the bit and the attachment element which is preferably configured as a screw, and the attachment element may be screwed into the anchoring base by it. An adaption of the bit projection and/or the bit length to the bit sleeve may be performed.

Hence, according to an exemplary embodiment of the invention, a stable non-magnetic mechanical bit holder for the wood construction may be provided. A preferred application field of such a bit holder is the wood construction when using screws in particular in a range of a core diameter between 5 mm and 10 mm. Experiments have shown that the mechanics of conventional bit holders may be damaged when more deeply countersinking the countersunk screw, such that users preferably use 50 mm bits or magnetic bit holders. According to an embodiment of the invention, using a bit holder may be flexibly performed also when countersinking an attachment element in the interior of an anchoring base. According to an exemplary embodiment, also in such a scenario, a reliable mechanical impact protection of the bit holder may be ensured.

FIG. 1 shows a three-dimensional view of a bit holder 100 with a received bit 102 according to an exemplary embodiment of the invention.

In more detail, in FIG. 1, an arrangement 150 for inserting an attachment element which is not illustrated in FIG. 1 (see reference sign 114 in FIG. 13 to FIG. 20) into an anchoring base which is not illustrated in FIG. 1 (see reference sign 112 in FIG. 15 to FIG. 20) is shown. The attachment element may be a wood screw and the anchoring base may be a wood base.

The arrangement 150 comprises a metallic bit holder 100 for holding a metallic bit 102 at a drive tool (for example a cordless screwdriver) which is also not illustrated in FIG. 1. Furthermore, the arrangement 150 includes the bit 102 which is received at a receiving unit 106 of the bit holder 100 according to FIG. 1. Thus, the bit holder 100 serves for holding a bit 102 at the drive tool which in turn may rotatingly drive the bit holder 100 and thereby indirectly the bit 102 and finally the attachment element which is engaged by the bit 102.

As shown in FIG. 1, the bit holder 100 comprises at its one end the already mentioned receiving unit 106 which is configured for form-lockingly receiving the bit 102 in a receiving opening of the receiving unit 106. In the receiving opening, an internal hexagon may be formed which may receive an external hexagon 144 of the bit 102. Furthermore, the bit holder 100 includes at its opposing end a tool coupling 108 which is configured for form-lockingly coupling with the drive tool. According to FIG. 1, the tool coupling 108 comprises an external hexagon 130 which may be received in a chuck of the drive tool.

Advantageously, the bit holder 100 additionally includes an impact load protection unit 110 which is circumferentially enclosing an end of the bit 102 which is received at the receiving unit 106. The impact load protection unit 110 functions for reducing an impact load which is acting on the bit holder 100 when impinging on the anchoring base at the end of the process of rotatingly placing the attachment element into the anchoring base. In other words, the impact load protection unit 110 impinges on the anchoring base in an impact-damping, impact-receiving, or impact-absorbing manner, when the attachment element which is driven by the bit 102, the drive tool, and the bit holder 100 is deeply inserted into the anchoring base. As can be seen in FIG. 1, the impact load protection unit 110 comprises an inclined surface 116 which is facing the anchoring base in operation, which is configured as an annular inclined surface 116. Descriptively, consequently, the impact load protection unit 110 impinges on an outer surface of the anchoring base not frontally, but inclinedly, which leads to an impact-damping and frictional force introduction and thus to a mechanical protection of the bit holder 100. Furthermore, the impact load protection unit 110 may comprise a front surface 118 which is oriented in parallel with respect to the anchoring base 112, between the inclined surface 116 and the anchoring base, which preferably is configured as small-area annular front surface 118. The annular front surface 118 of the impact load protection unit 110 may form an axial end of the bit holder 100. When placing on the anchoring base, at first a small-area contact between the annular front surface 118 and the anchoring base may arise which inhibits a tilting of the bit holder 100. Subsequently, the inclined surface 116 with a larger area may come in contact with the anchoring base, whereby in particular an impact force may be reduced or absorbed which otherwise would act on a fixing sleeve 124 of the bit holder 100. The inclined surface 116 gives a user a sufficiently early haptic feedback that the outer side of the anchoring base is reached.

According to FIG. 1, the impact load protection unit 110 comprises an approximately truncated cone-shaped ring body portion 121 which is facing the anchoring base in operation. At the backside, a disk-shaped ring body portion 123 with a substantially semicircular circumferential edge 125 is adjoining. The both ring body portions 121, 123 are integrally formed. The impact load protection unit 110, in the state of the bit 102 received at the receiving unit 106, may extend around the bit 102 in a circumferentially closed manner and may thus provide an impact protection also in the radial direction. Advantageously, the impact load protection unit 110 may also be made of a non-magnetic material, which makes an undesired adhesion of metallic particles at the bit holder 100 impossible which may be sheared off from the attachment element in operation, for example. Such an adhesion of metallic particles may impair the precision of inserting the attachment element into the anchoring base by the bit holder 100 and the bit 102.

Furthermore, FIG. 1 shows that the bit holder 100 comprises a collar-shaped fixing sleeve 124 for selectively fixing or releasing the bit 102 at the receiving unit 106. The fixing sleeve 124 is configured such that by axially displacing the fixing sleeve 124 along a bit sleeve 126, fixing a bit 102 which is received at the receiving unit 106 may be activated or deactivated. When the fixing sleeve 124 is displaced forwardly in the direction of the bit 102 (i.e. according to FIG. 1 to the left), a sphere clamping (not shown) which is fixing the bit 102 in the interior of the fixing sleeve 124 may be released and the bit 102 may be removed from the receiving unit 106 with a low force-effort. Whereas, when the fixing sleeve 124 is backwardly displaced away from the bit 102 (i.e. according to FIG. 1 to the right), the sphere clamping in the interior of the fixing sleeve 124 may engage the bit 102 and may fix the bit at the receiving unit 106. This mechanism is advantageously actuatable by one hand.

The above described impact load protection unit 110 advantageously functions for absorbing an impact motion which is acting on the fixing sleeve 124 of the bit holder 100 when impinging on an anchoring base. Thus, the impact load protection unit 110 especially protects against a damage or even destruction of the fixing sleeve 124. As illustrated in FIG. 1, the impact load protection unit 110 at the front side shields the fixing sleeve 124 which is attached behind it in a protected manner from a direct mechanical impingement on the anchoring base.

Moreover, FIG. 1 shows that the bit holder 100 additionally comprises the collar-shaped bit sleeve 126 which is comprising the receiving unit 106, over which the fixing sleeve 124 is mounted or pushed on. Hence, the fixing sleeve 124 is mounted or pushed over the bit sleeve 126 at the side of the drive tool. Furthermore, the impact load protection unit 110 is attached over the bit sleeve 126 at the side of the bit, for example screwed there.

When the tool coupling 108 is mounted at the drive tool and when a drive tip 152 of the bit 102 engages in an inversely shaped drive of a head of the attachment element which is placed on an anchoring base with its tip, by rotatingly driving the drive tool, also the bit holder 100, the bit 102, and the attachment element are rotatingly driven. Thereby, the attachment, element which is configured as wood screw, for example, is rotatingly introduced into the anchoring base which is consisting of wood, for example. When the attachment element is deeply introduced in the interior of the anchoring base, such that also its end at the side of the bit (for example a screw head) enters the interior of the anchoring base, the front surface of the impact load protection unit 110 comes into physical contact with a planar outer surface of the anchoring base from a certain inserting depth on. However, due to the inclination of the inclined surface 116 with respect to the planar anchoring base, an uninhibited frontal collision between the bit holder 100 and the anchoring base is avoided. Instead, an inclined and frictional force transmission is performed which positively influences the impact load which is acting on the bit holder 100. Rotating the attachment element with the bit holder 100 when placing the attachment element into the anchoring base leads to a high friction force when touching the anchoring base by the impact load protection unit 110, which inhibits a further introduction of the attachment element and the bit holder 100 into the anchoring base. By the described phenomena, advantageously a reduction of the impact load occurs which is acting on the bit holder 100 and in particular on its fixing sleeve 124.

Since the impact load protection unit 110 radially protrudes beyond the rest of the bit holder 100 along an entire circumference of the bit holder 100, the impact load protection unit 110 in particular protects the fixing sleeve 124 from lateral mechanical influences.

Figures 2, 3, 4:
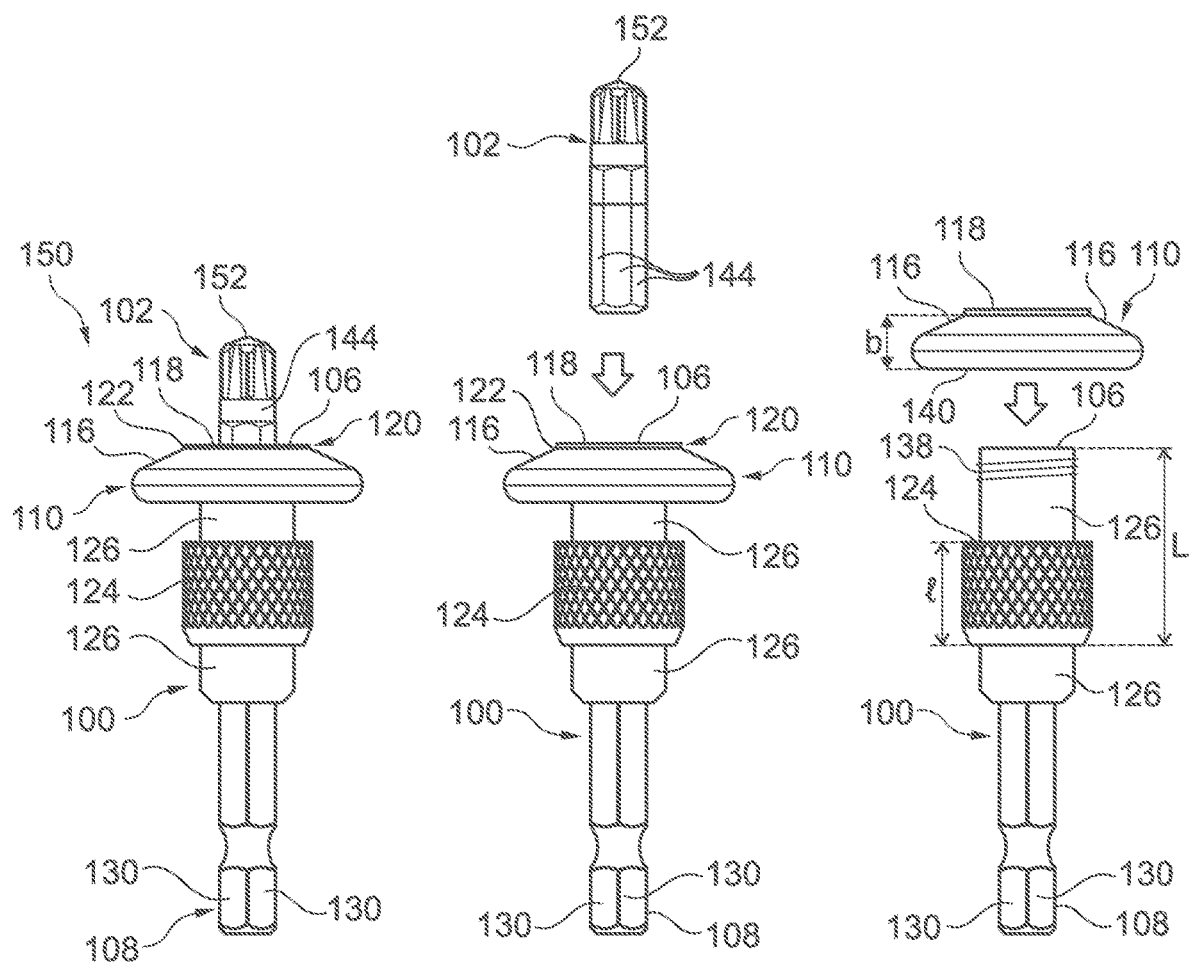
FIG. 2 shows a side view of the hit holder with a received bit according to an exemplary embodiment of the invention.
FIG. 3 shows a side view of the bit holder according to FIG. 2 separated from the bit.
FIG. 4 shows the side view of the bit holder according to FIG. 2 and FIG. 3 separated from an impact load protection unit.
Figure 21:
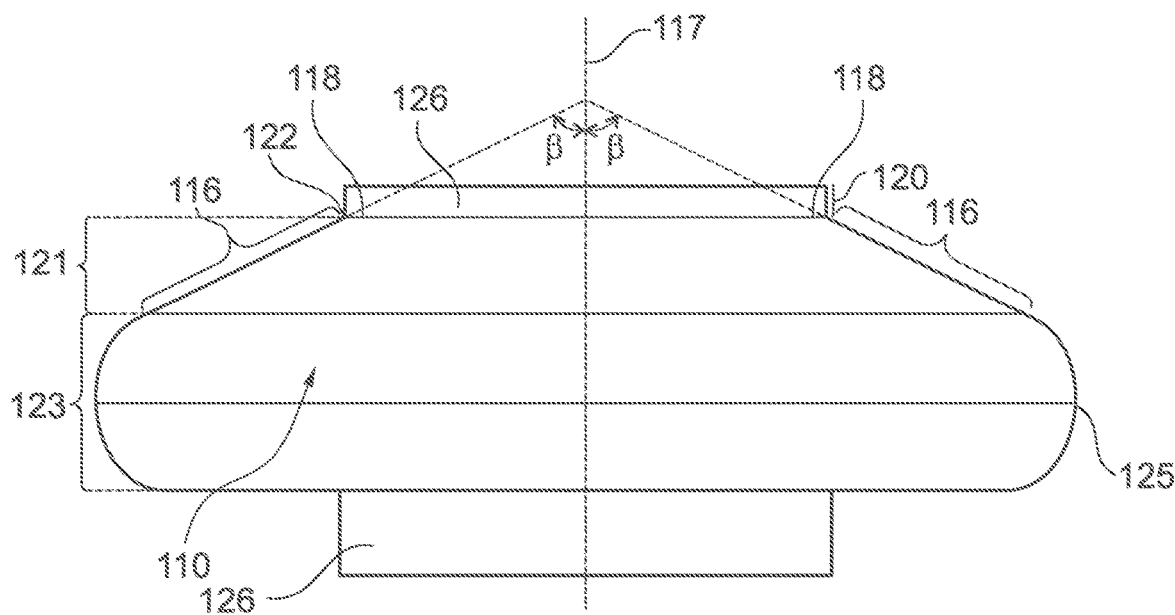
FIG. 21 shows a side view of an impact load protection unit of a bit holder according to an exemplary embodiment of the invention.

FIG. 2 shows a side view of a bit holder 100 with a received bit 102 according to an exemplary embodiment of the invention. FIG. 3 shows a side view of the bit holder 100 according to FIG. 2, but separated from the bit 102. FIG. 4 shows a side view of the bit holder 100 according to FIG. 2 and FIG. 3, but without the bit 102 and separated from an impact load protection unit 110. FIG. 21 shows a side view of an impact load protection unit 110 of the bit holder 100 according to FIG. 2 to FIG. 4.

In particular FIG. 4 shows that the impact load protection unit 110 may be replaceably attached to the bit holder 100. In more detail, the impact load protection unit 110 may be screwed on an external thread 138 of the bit sleeve 126. On the external thread 138 at the end of the bit sleeve 126 at the side of the bit, an internal thread 140 of the impact load protection unit 110 may be screwed. In this way, the impact load protection unit 110 which is exposed to a mechanical influence in the placing process of the attachment element in a special manner, after wearing, may be unscrewed from the bit holder 100 and may be replaced by a new impact load protection unit 110.

Optionally, an end of the bit sleeve 126 may slightly protrude with respect to the annular front surface 118 of the impact load protection unit 110 in the axial direction and along the central axis 117, respectively, to thereby form a hollow cylindrical ring connector 120 (for example with an axial length of 1-2 mm) which is joining the annular front surface 118 at a step 122. Advantageously, such a ring connector 120 may be used for welding the impact load protection unit 110 at the front side to the bit sleeve 126. Such an optionally welding of the impact load protection unit 110 to the bit sleeve 126 may be advantageous if an especially robust configuration of the bit holder 100 is desired. Under especially harsh using conditions, a screwed impact load protection unit 110 may undesiredly release from the bit sleeve 126 in operation. This may be prevented by welding. An especially high robustness may be achieved when welding the impact load protection unit 110 to the bit sleeve 126 is performed at an axial front side and at an axial backside of the impact load protection unit 110.

As can be seen in FIG. 4, the fixing sleeve 124 extends in the axial direction along an axial extension I of only approximately 35% of the axial extension L of the bit sleeve 126. The impact load protection unit 110 extends in the axial direction along an axial extension b of only approximately 20% of the axial extension L of the bit sleeve 126. This enables an attachment of the fixing sleeve 124 and the impact load protection unit 110 to the fixing sleeve 126 without negatively impairing the function and the handling of the fixing sleeve 124 and the impact load protection unit 110.

According to FIG. 21, an acute angle β between the inclined surface 116 and a central axis 117 of the bit holder 100 deviates from a right angle only about approximately 15-20°. Such angles β constitute a good compromise between a proper impact force damping and the avoidance of a susceptibility to tilting.

FIG. 5 shows a side view of a bit holder 100 with a received bit 102 according to an exemplary embodiment of the invention. FIG. 6 shows a side view of the bit holder 100 according to FIG. 5 without the bit 102.

According to FIG. 5 and FIG. 6, the annular front surface 118 of the impact load protection unit 110 forms an axial end of the bit holder 100. According to this embodiment, the bit sleeve 126 has its one end in the interior of the impact load protection unit 110, or said end may be aligned with the annular front surface 118.

FIG. 7 shows a side view of a bit holder 100 with a received bit 102 according to an exemplary embodiment of the invention. FIG. 8 shows the side view of the bit holder 100 according to FIG. 7 without the bit.

According to FIG. 7 and FIG. 8, an outer surface of the fixing sleeve 124 is at least partially provided with a knurling 154 which facilitates the handling of the fixing sleeve 124 for a user for fixing and/or releasing the bit 102 by backward and forward displacing the fixing sleeve 124 on the bit sleeve 126. In other words, the knurling 154 facilitates the gripability of the fixing sleeve 124 by a user.

Figure 9:
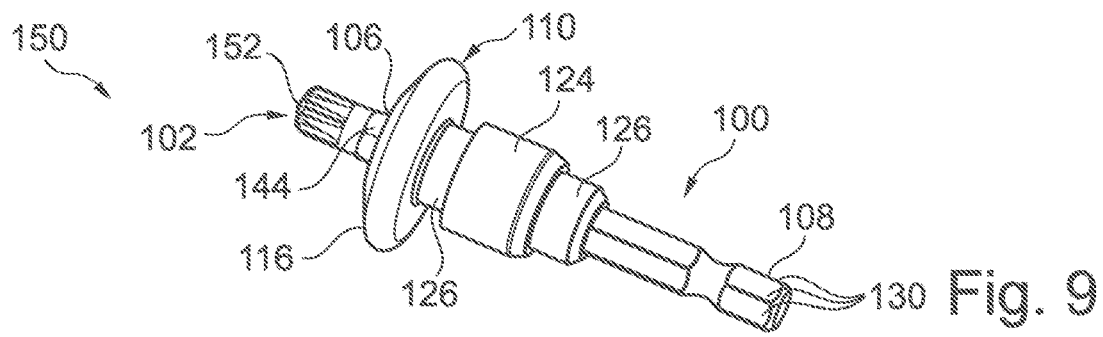
FIG. 9 shows a three-dimensional view of a bit holder with a received bit according to an exemplary embodiment of the invention.
Figure 10:
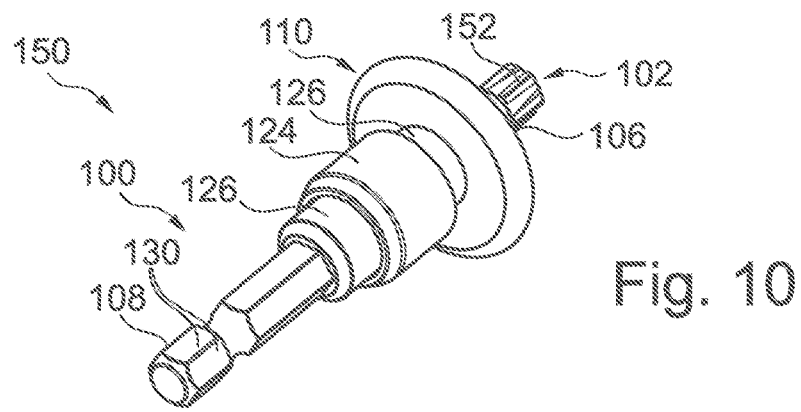
FIG. 10 shows another three-dimensional view of the bit holder according to FIG. 9.
Figure 11:
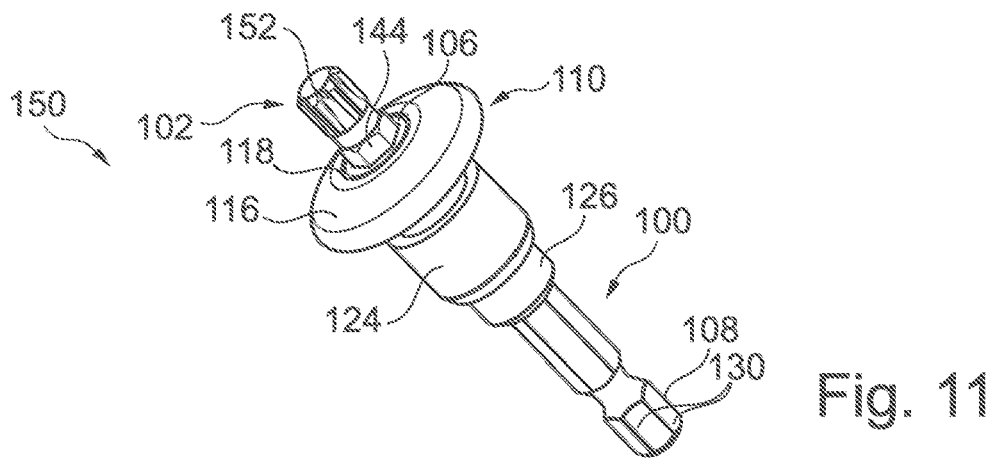
FIG. 11 shows a further three-dimensional view of the bit holder according to FIG. 9 and FIG. 10.
Figure 12:
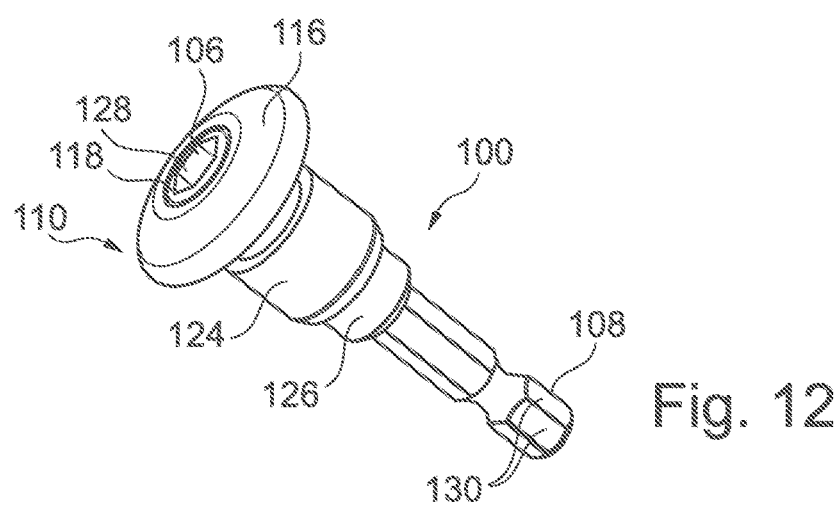
FIG. 12 shows a three-dimensional view of the bit holder without a bit which is approximately corresponding to FIG. 11.

FIG. 9 shows a three-dimensional view of a bit holder 100 with a received bit 102 according to an exemplary embodiment of the invention. FIG. 10 shows another three-dimensional view of the bit holder 100 according to FIG. 9. FIG. 11 shows a further three-dimensional view of the bit holder 100 according to FIG. 9 and FIG. 10. FIG. 12 shows a three-dimensional view of the bit holder 100 without the bit which is corresponding to FIG. 11.

FIG. 9 to FIG. 12 illustrate with their diverse spatial views different features of the bit holder 100. In particular in FIG. 12 it can be recognized that the receiving unit 106 comprises an internal hexagon 128 for receiving an external hexagon of the bit 102.

FIG. 13 to FIG. 17 show side views of a bit holder 100 with a received bit 102 during a method for inserting an attachment element 114 into an anchoring base 112 according to an exemplary embodiment of the invention.

In FIG. 13 to FIG. 17, an arrangement 150 of a schematically illustrated drive tool 104, a bit holder 100, a bit 102, an attachment element 114, and an anchoring base 112 is shown. A chuck of the drive tool 104 which may be a cordless screwdriver, for example, is coupled with the tool coupling 108 of the bit holder 100. The attachment element 114 which is configured as a wood screw (for example, as ASSY®-screw of the applicant Würth) has an indentation as drive (not shown) at the head 134, in which a drive tip 152 of the bit 102 is inserted to enable a torque transmission from the bit 102 to the attachment element 114. As shown in FIG. 13 to FIG. 17, the attachment element 114 which is attached to the bit 102 is rotatingly introduced into the anchoring base 112 made of wood by rotatingly driving the drive tool 104.

Figure 15:
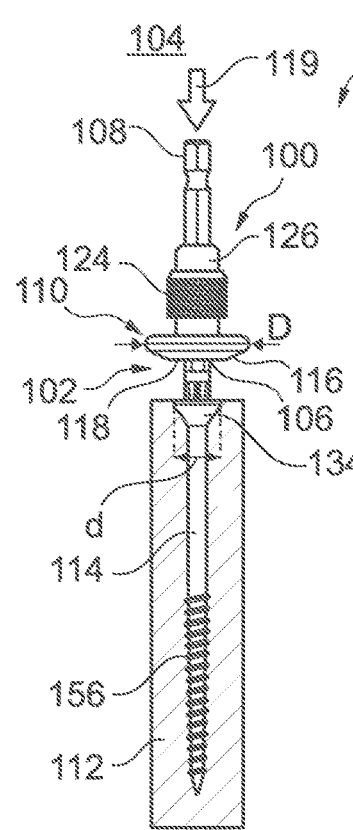

As illustrated in FIG. 15, an outer diameter D of the impact load protection unit 110 is larger than a maximum outer diameter d of the head 134 of the attachment element 114.

Figure 13:
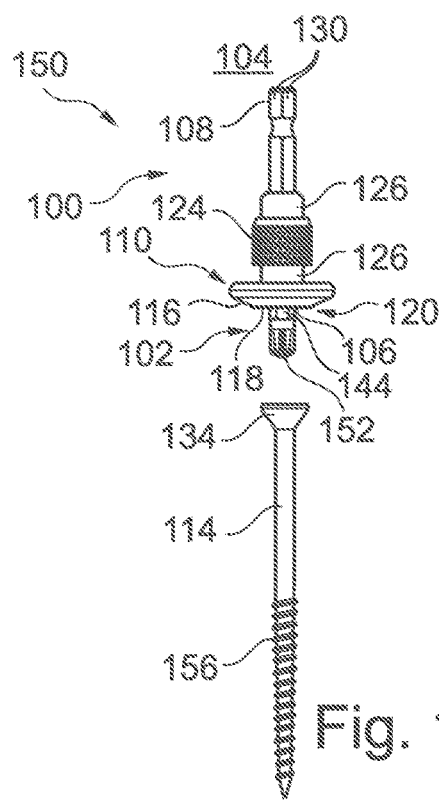
FIG. 13 to FIG. 17 show side views of a bit holder with a received bit during a method for inserting an attachment element into an anchoring base according to an exemplary embodiment of the invention.

Subsequently, a method for inserting the attachment element 114 into the anchoring base 112 by the bit 102 and the drive tool 104 and by the bit holder 100 is described in more detail:

Referring to FIG. 13, the tool coupling 108 of the bit holder 100 is coupled with the drive tool 104. Furthermore, the bit 102 is received at the receiving unit 106 of the bit holder 100.

Figure 14:
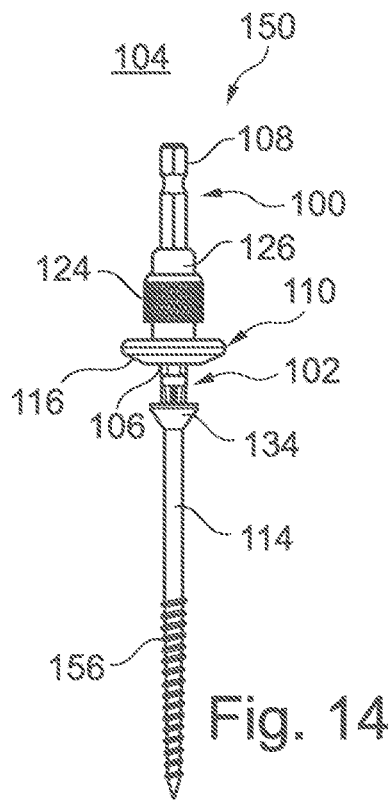

Referring to FIG. 14, the drive tip 152 of the bit 102 is inserted in the drive in the head 134 of the attachment element 114 and thereby a form fit is formed.

Referring to FIG. 15, subsequently, the attachment element 114 is inserted into the anchoring base 112 by applying a combined axial- and rotating force by the bit 102, the drive tool 104, end the bit holder 100. This may be performed subsequently or without forming a pilot hole in the anchoring base 112. When screwing in, an external thread 156 at a shaft of the attachment element 114 may cut a counter thread in the anchoring base 112. Thereby, the attachment element 114 may be placed and anchored in the anchoring base 112 which comprises wood. In the state according to FIG. 15, a front surface of the head 134 of the attachment element 114 is aligned with a planar outer surface of the anchoring base 112.

Figure 16:
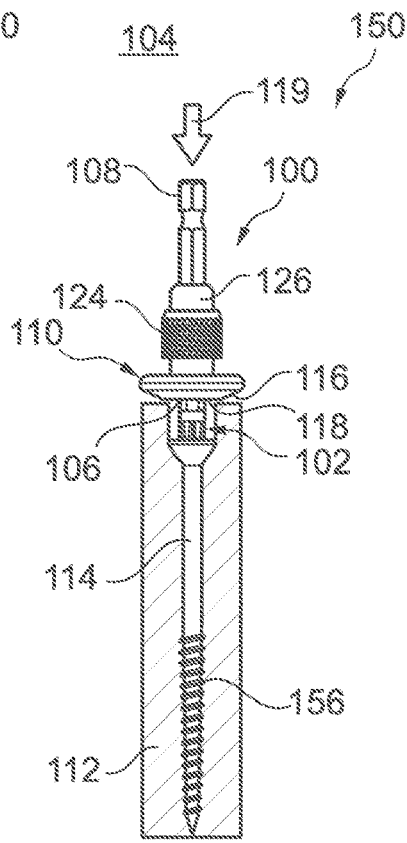

Referring to FIG. 16, it is shown what happens when the attachment element 114 enters even deeper into the anchoring base 112. At first, the head 134 of the attachment element 114 countersinks further into the anchoring base 112, such that also the bit 102 is partially located in the interior of the anchoring base 112. Thus, when inserting the attachment element 114 into the anchoring base 112, the head 134 of the attachment element 114 which is driven by the bit 102 is inserted deeper into the anchoring base 112 in a manner beyond the outer surface of the anchoring base 112. Then, the inclined surface 116 of the impact load protection unit 110 impinges on the outer surface of the anchoring base 112. This inclined contact reduces the impact force which is acting on the bit holder 100. A strong friction force when further rotating the impact load protection unit 110 at the outer surface of the anchoring base 112 additionally inhibits an even deeper insertion of the attachment element 114 in the anchoring base 112 and thus additionally delimits the load which is acting on the bit holder 100. Hence, by equipping the bit holder 100 with the impact load protection unit 110, the impact load which is acting on the bit holder 100 when impinging on the anchoring base 112 is reduced, and the bit holder 100 is therefore mechanically protected.

Figure 17:
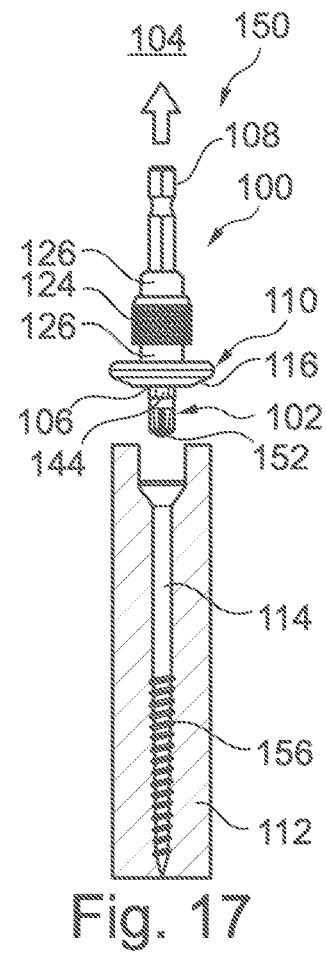

Referring to FIG. 17, it is shown how the drive tool 104 with the bit holder 100 and the bit 102 may be detached from the attachment element 102 which is placed in the anchoring base 112. The placing operation is finished without the bit holder 100 being damaged.

Figure 18:
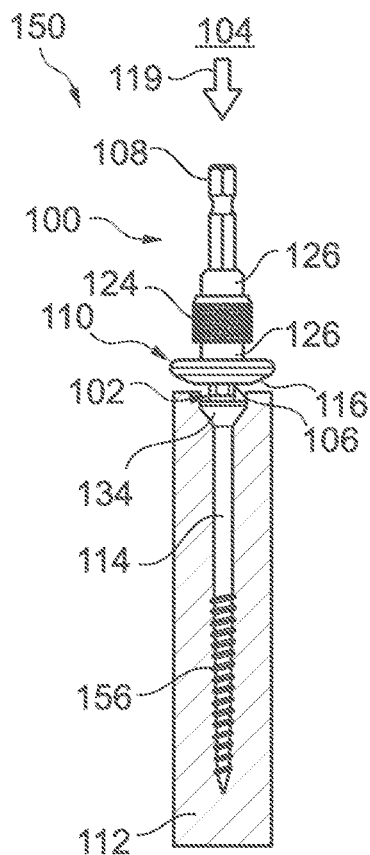
FIG. 18 to FIG. 20 show side views of bit holders with received bits during inserting an attachment element into an anchoring base according to exemplary embodiments of the invention.
Figure 19:
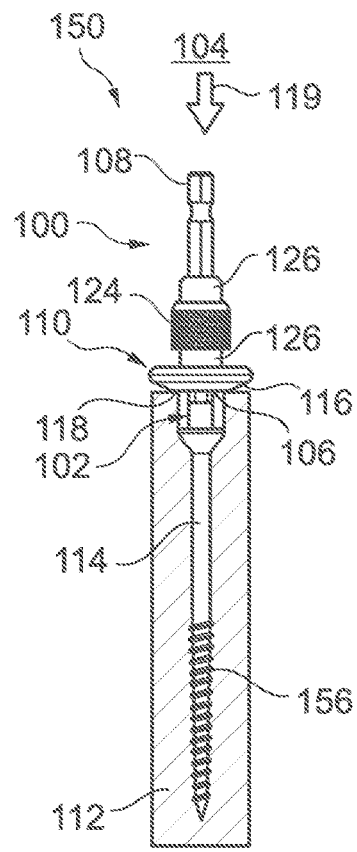
Figure 20:
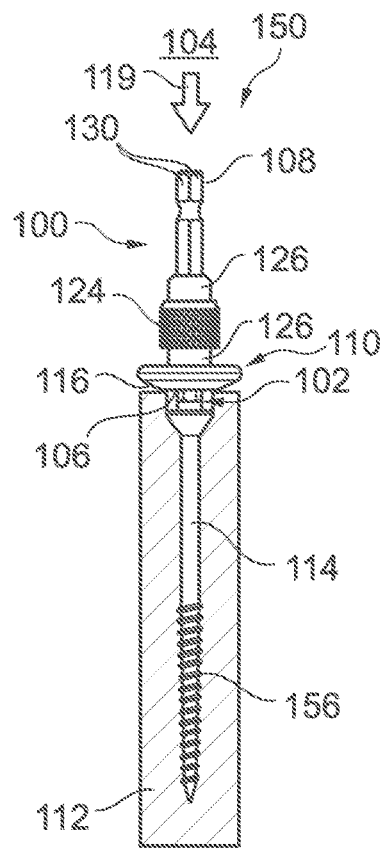

FIG. 18 to FIG. 20 show side views of bit holders 100 with received bits 102 during inserting an attachment element 114 into an anchoring base 112 according to exemplary embodiments of the invention.

Referring to FIG. 18, a scenario with an extended bit sleeve 126 and a bit 102 of a typical length is illustrated.

Referring to FIG. 19, a scenario with a bit sleeve 126 of a typical length and a bit 102 of a typical length is illustrated.

Referring to FIG. 20, a scenario with a bit sleeve 126 of a typical length and with a shortened bit 102 is illustrated.

Thus, FIG. 18 to FIG. 20 show that an adaption of the bit protrusion, the length of the bit 102, and the length of the bit sleeve 120 is possible.

Additionally, it should be noted that "comprising" does not exclude other elements or steps and "a" or "an" does not exclude a plurality. Furthermore, it should be noted that features or steps which are described with reference to one of the above embodiments may also be used in combination with other features or steps of other ones of the above described embodiments. Reference signs in the claims shall not be construed as limitation.

The invention claimed is:

1. A bit holder for holding a bit for coupling the bit with a drive tool, wherein the bit holder comprises:
a receiving unit which is configured for receiving the bit;
a tool coupling which is configured for coupling with the drive tool;
a fixing sleeve which is fixes the bit at the receiving unit; and
an impact load protection unit which protects the fixing sleeve from an impact load which would act on the fixing sleeve without the impact load protection unit, when impinging the bit holder on an anchoring base;
wherein the bit holder comprises a bit sleeve, over which the fixing sleeve is mounted; and
wherein the bit sleeve comprises an external thread on which an internal thread of the impact load protection unit is screwable or screwed.

2. The bit holder according to claim 1, wherein the impact load protection unit comprises an inclined surface which is facing the anchoring base.

3. The bit holder according to claim 2, wherein the impact load protection unit comprises a front surface which is arranged with respect to the inclined surface in an inserting direction at a front side and which is oriented perpendicularly to the inserting direction.

4. The bit holder according to claim 3, comprising one of the following features:
wherein the annular front surface of the impact load protection unit forms an axial end of the bit holder;
wherein the bit sleeve of the bit holder protrudes with respect to the annular front surface of the impact load protection unit in the inserting direction, to thereby form a hollow cylindrical ring connector which is joining the annular front surface at a step.

5. The bit holder according to claim 2, wherein an angle between the inclined surface and a central axis of the bit holder deviates from a right angle by a maximum of 30°.

6. The bit holder according to claim 1, wherein the impact load protection unit comprises a truncated cone-shaped ring body portion which is facing the anchoring base.

7. The bit holder according to claim 1, comprising at least one of the following features:
wherein the impact load protection unit is replaceably attached to the bit holder;
wherein the impact load protection unit, in the state of the bit received at the receiving unit, extends circumferentially closed around the bit; and
wherein the impact load protection unit is made of a non-magnetic material.

8. The bit holder according to claim 1, comprising at least one of the following features:
wherein the fixing sleeve is configured to selectively fix or release the bit which is received at the receiving unit by displacing the fixing sleeve; and
wherein the impact load protection unit is configured for receiving an impact motion which is acting on the fixing sleeve of the bit holder when impinging on the anchoring base without the impact load protection unit.

9. The bit holder according to claim 1, comprising at least one of the following features:
wherein the fixing sleeve is mounted over the bit sleeve at the side of the drive tool, and the impact load protection unit is mounted over the bit sleeve at the side of the bit;
wherein the fixing sleeve extends in the axial direction along a maximum of 50% of an axial extension of the bit sleeve; and
wherein the impact load protection unit extends in the axial direction along a maximum of 30% of an axial extension of the bit sleeve.

10. The bit holder according to claim 1, comprising at least one of the following features:
wherein the receiving unit comprises an internal hexagon;
wherein the tool coupling comprises an external hexagon;
wherein the impact load protection unit protrudes radially over the rest of the bit holder along an entire circumference of the bit holder.

11. An arrangement for inserting an attachment element into an anchoring base, wherein the arrangement comprises:
a bit holder according to claim 1 for holding a bit for coupling the bit with a drive tool; and
the bit which is received or receivable at the receiving unit of the bit holder.

12. The arrangement according to claim 11, comprising the drive tool which is coupled or coupleable with the tool coupling of the bit holder.

13. The arrangement according to claim 12, wherein the drive tool is selected from a group which is consisting of a cordless screwdriver, a cordless screw driller, a mechanical screwdriver, an impulse screwdriver, a ratchet screwdriver, a drilling machine, an impact wrench, a hammer driller, a rotatable handle, a screwdriver handle, an angled handle, a ratchet, and a torque wrench.

14. The arrangement according to claim 11, comprising the attachment element which is drivable by the bit.

15. The arrangement according to claim 14, comprising at least one of the following features:
   wherein the attachment element is a wood screw;
   wherein an outer diameter of the impact load protection unit is larger than a maximum outer diameter of the attachment element.

16. The arrangement according to claim 11, comprising the anchoring base in which the attachment element is inserted or insertable.

17. A method of inserting an attachment element into an anchoring base by a bit and a drive tool, wherein the method comprises:
   receiving the bit in a receiving opening of a receiving unit of a bit holder;
   fixing the bit in the receiving opening of the receiving unit by means of a fixing sleeve of the bit holder;
   coupling a tool coupling of the bit holder with the drive tool;
   inserting the attachment element into the anchoring base by applying an inserting force which is acting on the attachment element by the bit, the drive tool and the bit holder; and
   providing the bit holder with an impact load protection unit which protects the fixing sleeve from an impact load which would act on the fixing sleeve without the impact load protection unit, when impinging the bit holder on the anchoring base when inserting;
   wherein the bit holder comprises a bit sleeve, over which the fixing sleeve is mounted;
   wherein the bit sleeve comprises an external thread on which an internal thread of the impact load protection unit is screwable or screwed.

18. The method according to claim 17, comprising at least one of the following features:
   wherein the method comprises inserting the attachment element into an anchoring base which is comprising wood;
   wherein the method comprises inserting the attachment element into the anchoring base, such that a head of the attachment element which is driven by the bit, in the inserted state, extends deeper in the anchoring base in a manner beyond an outer surface of the anchoring base.

* * * * *